(12) United States Patent
Yamasaki et al.

(10) Patent No.: US 9,132,791 B2
(45) Date of Patent: Sep. 15, 2015

(54) BLIND SPOT MONITOR ASSEMBLY

(71) Applicant: Toyota Motor Engineering & Manufacturing North America, Inc., Erlanger, KY (US)

(72) Inventors: Bryan Else Yamasaki, Ann Arbor, MI (US); Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 484 days.

(21) Appl. No.: 13/656,255

(22) Filed: Oct. 19, 2012

(65) Prior Publication Data

US 2014/0111950 A1 Apr. 24, 2014

(51) Int. Cl.
*H05K 7/00* (2006.01)
*B23P 11/00* (2006.01)
*B60R 11/00* (2006.01)
*F16M 11/00* (2006.01)
*B60R 16/023* (2006.01)

(52) U.S. Cl.
CPC ....... *B60R 16/0239* (2013.01); *Y10T 29/49947* (2015.01)

(58) Field of Classification Search
CPC ................ B60R 11/00; B60R 16/0239; Y10T 29/49947
USPC ......... 174/50, 520, 61, 535; 361/600, 679.01, 361/728, 747, 752, 825; 29/525.01, 592, 29/428; 248/200, 205.1, 220.21, 220.22, 248/201, 27.1
See application file for complete search history.

(56) References Cited

U.S. PATENT DOCUMENTS

| | | | | |
|---|---|---|---|---|
| 5,080,188 A | * | 1/1992 | Okuhara et al. | 180/282 |
| 5,676,338 A | * | 10/1997 | Warda et al. | 248/27.1 |
| 6,729,429 B2 | * | 5/2004 | Takahashi | 180/271 |
| 6,927,677 B2 | | 8/2005 | Anderson et al. | |
| 7,734,171 B2 | | 6/2010 | Leonelli, Jr. | |
| 8,437,134 B2 | * | 5/2013 | Sarginger | 361/688 |
| 2008/0315050 A1 | * | 12/2008 | Buckley et al. | 248/205.1 |

FOREIGN PATENT DOCUMENTS

| | | |
|---|---|---|
| JP | 2005209351 A | 8/2005 |
| JP | 2006096079 A | 4/2006 |

* cited by examiner

*Primary Examiner* — Angel R Estrada
*Assistant Examiner* — Dimary Lopez Cruz
(74) *Attorney, Agent, or Firm* — Gifford, Krass, Sprinkle, Anderson & Citkowski, P.C.

(57) ABSTRACT

A bracket for a vehicle blind spot monitor. The bracket can have upper and bottom members that are spaced apart from each other and connected by a side member. The upper, bottom and side members of the bracket can also form an opening where a blind spot monitor can be located. The bottom member can have a debris-blocking flange that protects or shields the outer radar surface from debris such as rocks, sand, etc., that are thrown up from a road surface towards the blind spot monitor. The bracket can have a plurality of protrusions to guide the blind spot monitor into the bracket opening. The bracket additionally features clips that affix the blind spot monitor to the bracket prior to installation on the vehicle.

11 Claims, 4 Drawing Sheets

BLIND SPOT MONITOR ASSEMBLY

FIELD OF THE INVENTION

The present invention relates to a blind spot monitor assembly for a motor vehicle, and in particular to a bracket that affixes to a blind spot monitor module prior to mounting the blind spot monitor assembly on a motor vehicle.

BACKGROUND OF THE INVENTION

Blind spot monitors have been provided on vehicles to alert a driver when an object or vehicle is in a spot that the driver cannot readily see. Blind spot monitors have been placed behind a rear wheel of the vehicle and fixed to the rear panel, with this location allowing the monitor to detect objects that are present in a location not able to be viewed by the driver via side mirrors and/or a rear view mirror. However, blind spot monitors have a sensitive, electromagnetic radiation emitting outer face which can be damaged with impact by debris. Accordingly, there exists a need in the art to provide a structure that will protect the blind spot monitor from debris from the road surface.

Furthermore, automotive blind spot monitors may be designed to be utilized across many different vehicle models to keep cost down, often employing a single modular design that may need to be adapted to a specific vehicle. With this in mind, the structure that protects the blind spot monitor should preferably be both inexpensive and make use of existing mounting structures on the vehicle's panel when possible.

Protective structures that attach to modular blind spot monitors are typically installed by a worker while mounting the blind spot monitor to the vehicle. There are normally at least two blind spot monitors per vehicle and each monitor has its own accompanying protective structure. This means that a worker has to carry and install at least four individual parts for each vehicle. There exists the need for a protective structure that meets all of the aforementioned criteria and can be affixed to the blind spot monitor prior to final installation on a vehicle to reduce both the assembly burden on the worker and the number of individual parts they need to hand carry to the vehicle.

SUMMARY OF THE INVENTION

The present invention relates to a blind spot monitor assembly for protecting and mounting a blind spot monitor to a vehicle. Additionally included is a rear panel of a vehicle with a plurality of mounting posts, a blind spot monitor, and a bracket.

The bracket may be formed of metal, plastic or any other resilient material used in the manufacture of vehicle parts, and the bracket can have upper and bottom members that are spaced apart from each other and connected by a side member. The upper, bottom and side members of the bracket can also focal an opening where a blind spot monitor can be located.

The bracket can have a plurality of apertures for fasteners with at least one aperture located on each of the upper, bottom and side members. The apertures may be positioned on the bracket so that they are concentric with corresponding apertures in the blind spot monitor when the monitor is affixed to the bracket. The bracket can also have a plurality of strengthening ribs that increase the bracket's durability and resilience. The bracket may be first removably fixed to the blind spot monitor using clips or other fasteners and then the resulting assembly may be removably fixed to the mounting posts of the vehicle panel using fasteners or permanently welded to the rear panel of the vehicle.

The bottom member can have a debris-blocking flange that extends at an angle from the bottom member in a generally horizontal direction. The debris-blocking flange is dimensioned to block debris thrown up by the rear tire from traveling upwards into the opening. Additionally, the debris-blocking flange may also block any other moving debris, for example, debris put into motion by other vehicles.

A blind spot monitor having an outer face and an inner face may be placed in the bracket opening. The outer face of the blind spot monitor lies in the opening, between the front and rear planes of the bracket. Electromagnetic radiation is emitted from the outer face so that the blind spot monitor is operable to detect an object in the blind spot of the vehicle. Alternative detection methods including, but not limited to, ultra sound or infra-red may also be used as is known to those skilled in the art. The blind spot monitor outer face generally defines an outer vertical plane and the blind spot monitor inner face generally defines an inner vertical plane spaced apart from the outer vertical plane. A plurality of flanges extend outward along the inner face and contain apertures to receive the mounting posts.

The bracket can have a plurality of rounded protrusions that extend from the bracket members into the bracket opening. The rounded protrusions can be positioned along the members to contact the blind spot monitor between the two faces and help the worker guide the blind spot monitor into the bracket opening during attachment to the bracket. The protrusions also help ensure that the blind spot monitor and the bracket maintain proper alignment during the final installation onto the mounting posts of the vehicle.

The bracket can also have a plurality of flange guides located on its inner face, proximate to the bracket apertures. The flange guides receive the blind spot monitor's extended flanges when the blind spot monitor is inserted into the bracket opening. The flange guides serve to further locate the blind spot monitor within the bracket opening and align the apertures of the blind spot monitor with those of the bracket.

The bracket may also have a plurality of clips for affixing the blind spot monitor to the bracket prior to the assembly's installation on the mounting posts. The clips may be on the rear plane of the bracket such that the clips engage a portion of the blind spot monitor against the rear plane of the bracket. The clips may be located near the bracket apertures to engage the blind spot monitor near its periphery. The clips may be biased in a direction from the exterior of the bracket towards the bracket opening to affix the blind spot monitor within the bracket opening. The clips on the upper and bottom members may further be biased from the exterior of the bracket towards the side member to affix the blind spot monitor within the bracket opening. The clips may work in conjunction with the rounded protrusions and the flange guides to affix the blind spot monitor to the bracket.

DETAILED DESCRIPTION OF THE INVENTION

A bracket for protecting a blind spot monitor mounted behind a rear tire in a vehicle is provided. The bracket can shield an outer face of the blind spot monitor from debris thrown up by the rear tire. The bracket can additionally affix to the blind spot monitor prior to the assembly being mounted on the vehicle to reduce the installation burden and make the assembly easier to install. As such, the bracket has use as a component for the motor vehicle.

Figure 1:
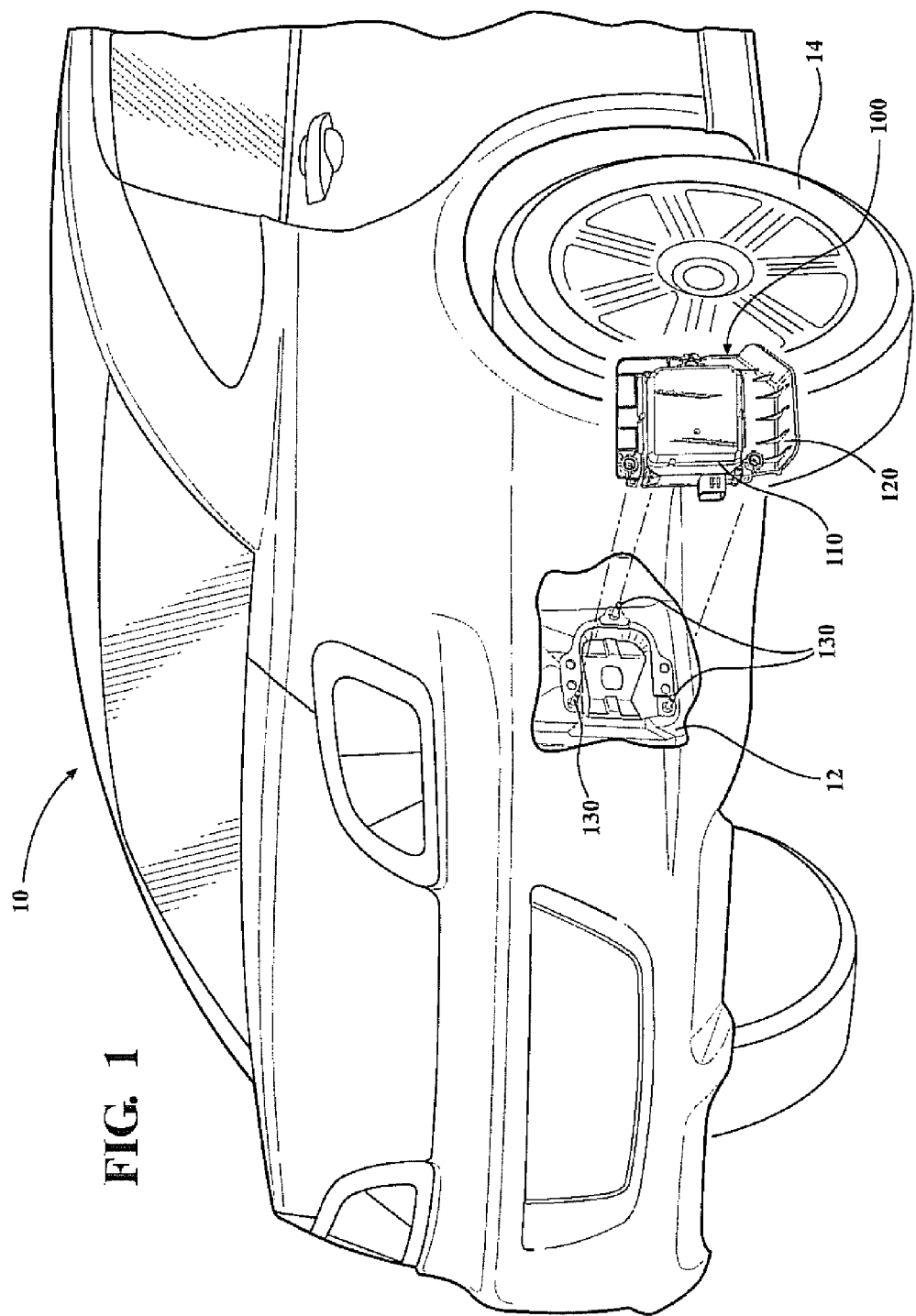
FIG. 1 is a view of a blind spot monitor assembly for a rear portion of a vehicle.
Figure 2:
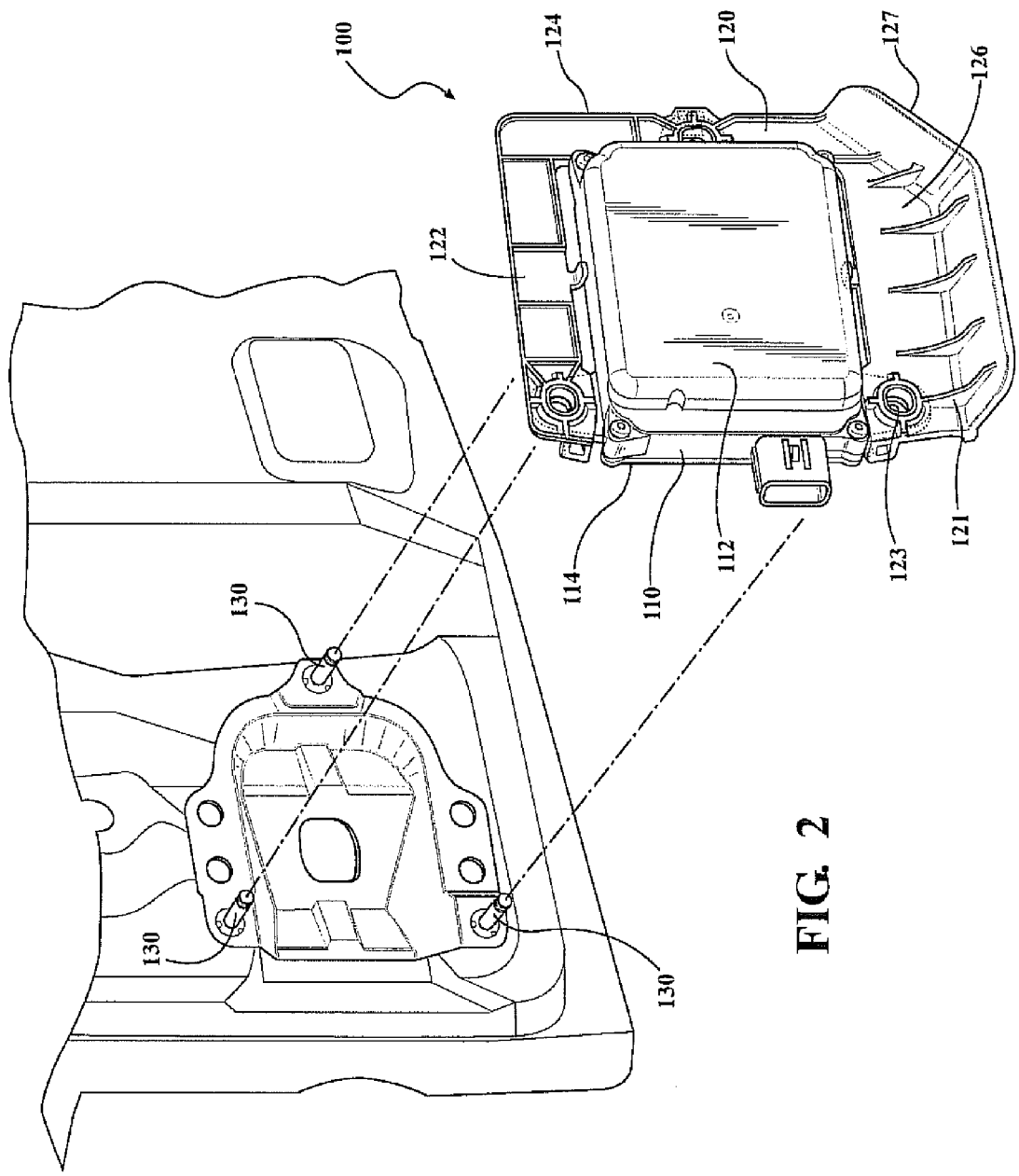
FIG. 2 is a perspective view of a blind spot monitor assembly.

Referring now to FIG. 1, a motor vehicle 10 with a rear panel 12 and mounting posts 130 is generally shown along with a blind spot monitor assembly 100 comprising a blind spot monitor 110 and a bracket 120. The blind spot monitor assembly 100 is installed on the rear panel 12 of the motor vehicle 10 using a plurality of mounting posts 130. In the present embodiment, the blind spot monitor assembly 100 can be secured to the mounting posts 130 using fasteners or through welding, although other methods will be readily apparent to those skilled in the art.

The blind spot monitor assembly 100 is shown in more detail in FIGS. 2-5. The bracket 120 can have an upper member 122, a side member 124 and a bottom member 126. The side member 124 can connect and extend between the upper member 122 and the bottom member 126. The upper, side, and bottom members 122, 124, 126 can have ribs 121 for added strength and resilience. The upper, side, and bottom members 122, 124, 126 can also have a plurality of apertures 123 to receive the mounting posts 130. The bottom member 126 can also have a debris-blocking flange 127. The upper, side, and bottom members 122, 124, 126 can also form an opening 150 to receive the blind spot monitor 110.

The blind spot monitor 110 has an outer face 112 and an inner face 114. It is appreciated that the blind spot monitor 110 is operable to emit electromagnetic radiation that travels out through the outer face 112 and is further operable to measure the level of reflected radiation. By measuring the level of reflected radiation the blind spot monitor 110 can accurately determine whether or not an object, such as another vehicle (not shown) is present in a blind spot of the vehicle. Alternative detection methods including, but not limited to, ultra sound or infra-red may also be used by the blind spot monitor 110 as is known to those skilled in the art. The blind spot monitor outer face 112 is located in the opening 150 formed by the upper, side and bottom members 122, 124, 126 of the bracket 120.

The debris-blocking flange 127 is dimensioned to cover or shield the blind spot monitor 110 from debris being thrown upwardly from a road surface by the rear tire 14 and otherwise potentially damaging the monitor 110. The debris-blocking flange 127 extends at an angle from the bottom member 126, e.g. in a generally horizontal direction, in order to shield the blind spot monitor 110 from debris. The optional ribs 121 can extend out from the bottom member 126 to the debris-blocking flange 127 and thereby reinforce the debris-blocking flange 127.

Figure 3:
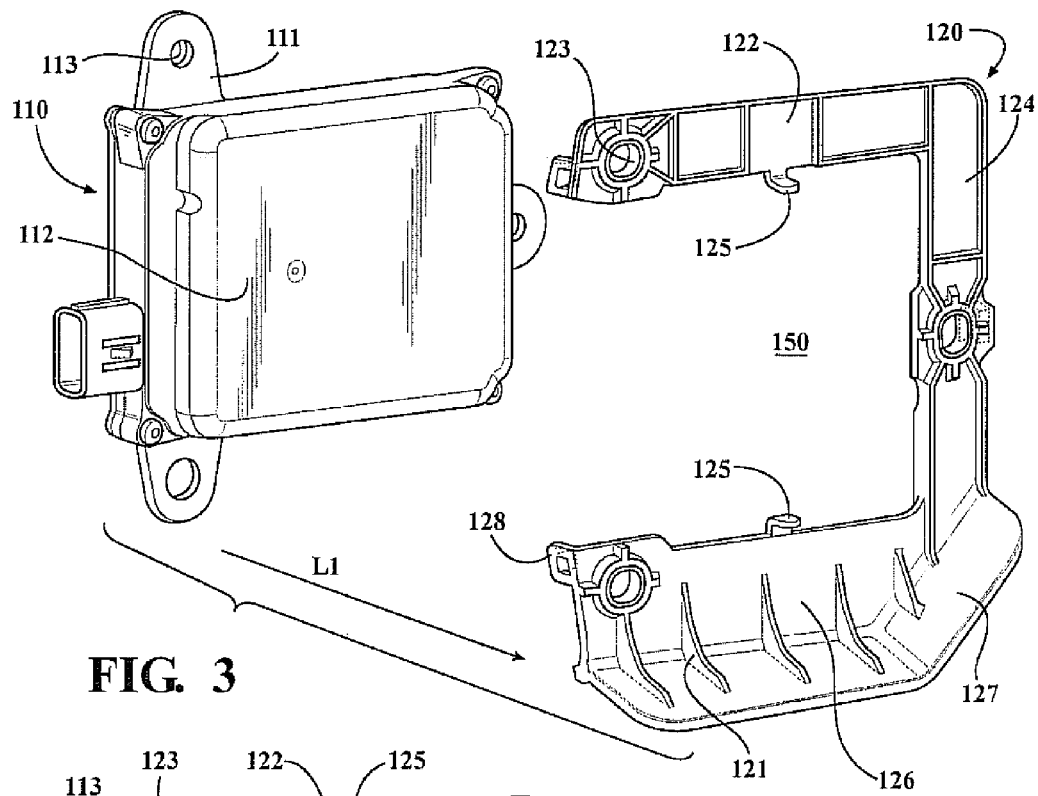
FIG. 3 is an exploded view of a blind spot monitor and a bracket for protecting the blind spot monitor.

The bracket opening 150 contains a plurality of rounded protrusions 125 for guiding the blind spot monitor 110 into the bracket 120. As shown in FIG. 3, in a preferred embodiment, the rounded protrusions 125 extend from the upper and bottom members 122, 126 into the bracket opening 150, although additional protrusions 125 may be added along the edge of the bracket opening 150. The rounded protrusions 125 are curved so that as the blind spot monitor 110 is inserted into the bracket 120 along line L1, the body of the blind spot monitor 110 abuts the rounded protrusions 125 and is guided into the bracket opening 150. When the blind spot monitor 110 and the bracket 120 are affixed together to form the assembly 100 the protrusions 125 maintain contact with the blind spot monitor 110.

Figure 4:
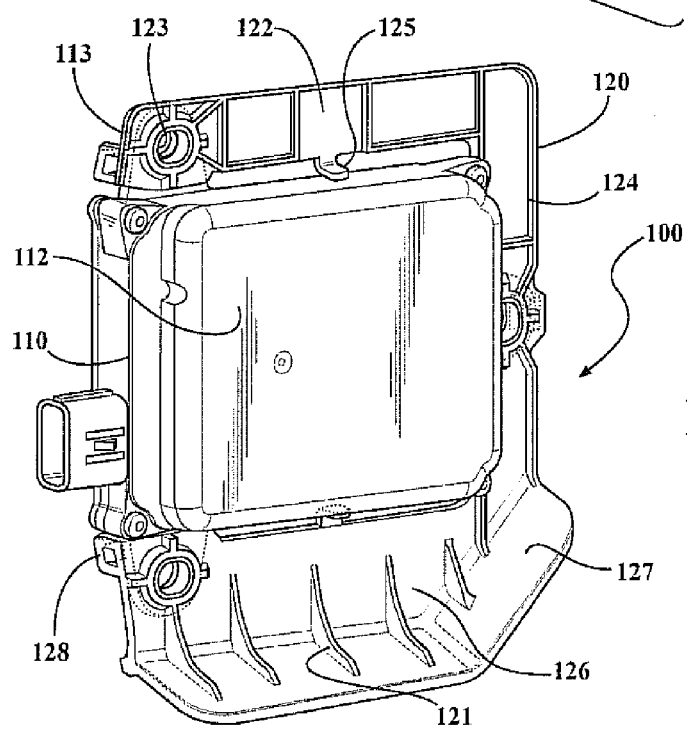
FIG. 4 is a perspective view of the blind spot monitor and bracket shown in FIG. 3 when assembled.

The completed blind spot monitor assembly 100 is shown with detail in FIG. 4. The bracket apertures 123 are concentric with the blind spot monitor apertures 113 so that the mounting post 130 may be inserted therein. The rounded protrusions 125 also are in contact with opposing sides of the blind spot monitor 110 to help maintain proper alignment of the blind spot monitor 110 with the bracket 120 so that the apertures 113, 123 remain concentric during installation of the assembly 100.

Figure 5:
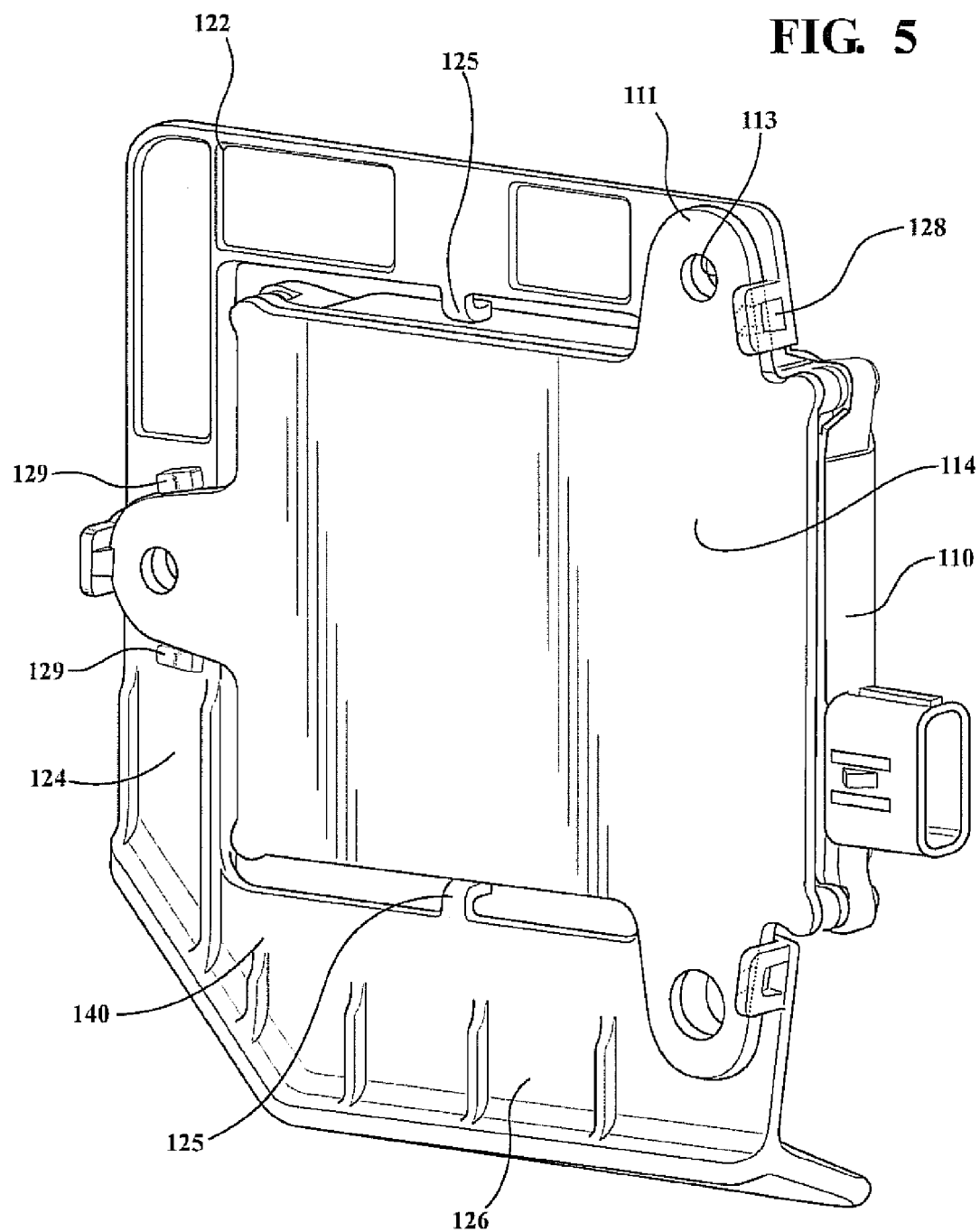
FIG. 5 is a perspective view of the assembly shown in FIG. 4 illustrating a rear side of the assembly.

Additional features of the bracket 120 are found on the rear plane of the bracket 140 and shown in more detail in FIG. 5. When the blind spot monitor 110 is fully inserted within the bracket opening 150 the extended flanges of the blind spot monitor 111 abut the rear plane 140. In addition to the rounded protrusions 125 extending from the upper and bottom members 122, 126 the bracket 120 further has flange guides 129 that may contact the extended flanges 111 of the blind spot monitor 110 to guide the monitor 110 into the bracket opening 150. In a preferred embodiment, the flange guides 129 are located near the bracket aperture 123 in the side member 124. However, additional flange guides 129 may be located on the rear plane 140 proximate to the other bracket apertures 123 so as to provide additional points of contact with the extended flanges 111 of the blind spot monitor 110.

A plurality of clips 128 also extend from the rear plane 140 of the bracket 120. The clips 128 may be of a size such that the clips 128 engage a portion of the blind spot monitor 110 against the rear plane 140 of the bracket 120. The clips 128 may be located near the bracket apertures 123 to engage the blind spot monitor 110 near its periphery. The clips 128 may be biased in a direction from the exterior of the bracket 120 towards the bracket opening 150 to affix the blind spot monitor 110 within the bracket opening 150. The clips 128 on the upper and bottom members 122, 126 may further be biased from the exterior of the bracket 120 towards the side member 124 to affix the blind spot monitor 110 within the bracket opening 150. The clips 128 may work in conjunction with the rounded protrusions 125 and the flange guides 129 to affix the blind spot monitor 110 to the bracket 120 and form an assembly 100.

The blind spot monitor assembly 100 can be welded to the rear panel 12 of the vehicle 10 or be attached to the rear panel 12 with one or more threaded fasteners to the mounting posts 130. The bracket 120 and the blind spot monitor 110 can have a plurality of concentric apertures 113, 123 for receiving the mounting posts 130 and thereby afford the blind spot monitor assembly 100 to be fixed and/or rigidly attached to the rear panel 12 using fasteners such as bolts, screws, and the like. The alignment of the apertures 113, 123 thus reduces the undue multiplication of parts keeping costs low, and reduces the complexity of installation relative to a system where separate fasteners must be used for the bracket 120 and for the blind spot monitor 110.

From the foregoing, it can be seen that the present invention provides a blind spot monitor assembly that combines a blind spot monitor with a bracket that attaches to the monitor prior to installation on a vehicle and is designed to deflect debris and protect the blind spot monitor. Having described the invention, however, many modifications thereto will become apparent to those skilled in the art to which it pertains without deviation from the spirit of the invention as defined by the scope of the appended claims.

We claim:

1. An electronics module assembly for mounting to a panel of a vehicle, the panel having a plurality of mounting posts; the electronics module assembly comprising:
   an electronics module, having at least one extended flange, the at least one extended flange having at least one module aperture, the at least one module aperture for receiving the mounting post;
   a bracket having a generally U shaped opening complementary to a portion of the electronics module for receiving the electronics module and having at least one bracket aperture, the at least one bracket aperture for receiving the mounting post; and
   an inner bracket surface having at least one clip for fastening the electronics module to the bracket.

2. The electronics module assembly of claim 1, further comprising:
   the electronics module having at least two parallel planar surfaces spaced apart from one another and joined along a module perimeter, defining a volume; and
   the bracket having the generally U shaped opening complementary to a portion of the module perimeter.

3. The electronics module assembly of claim 1, further comprising:
   the U shaped opening having at least one projecting feature that abuts the electronics module.

4. The electronics module assembly of claim 3, further comprising:
   the projecting features abut the electronics module along the module perimeter.

5. The electronics module assembly of claim 1, further comprising:
   the inner bracket surface having at least one locating portion for receiving the extended flange.

6. The electronics module assembly of claim 1, further comprising:
   the bracket apertures are concentric with the module apertures when the electronics module is fastened to the bracket.

7. A method for mounting an electronics module assembly to a panel of a vehicle, the panel having a plurality of mounting posts; the method comprising:
   providing an electronics module, having at least one extended flange and having at least one module aperture for receiving the mounting posts;
   providing a bracket having a generally U shaped opening complementary to a portion of the electronics module for receiving the electronics module and having at least one bracket aperture for receiving the mounting posts;
   providing an inner bracket surface having at least one clip for fastening the electronics module to the bracket to form the electronics module assembly; and
   mounting the electronics module assembly to the mounting posts of the panel.

8. The method of claim 7, further comprising:
   providing the U shaped opening having at least one projecting feature that abuts the electronics module;
   whereby the electronics module is guided by the projecting feature while being affixed to the bracket.

9. The method of claim 7, further comprising:
   providing the electronics module with at least two parallel planar surfaces spaced apart from one another and joined along a module perimeter, defining a volume;
   whereby the projecting features abut the electronics module along the module perimeter.

10. The method assembly of claim 1, further comprising:
    providing the inner bracket surface with at least one locating portion;
    whereby the locating portion receives the extended flange.

11. The method of claim 1, further comprising:
    providing bracket apertures that are concentric with the module apertures;
    whereby when the electronics module is fastened to the bracket, the mounting posts are inserted through the bracket apertures and the module apertures.

* * * * *

UNITED STATES PATENT AND TRADEMARK OFFICE
CERTIFICATE OF CORRECTION

| | |
|---|---|
| PATENT NO. | : 9,132,791 B2 |
| APPLICATION NO. | : 13/656255 |
| DATED | : September 15, 2015 |
| INVENTOR(S) | : Bryan Else Yamasaki |

It is certified that error appears in the above-identified patent and that said Letters Patent is hereby corrected as shown below:

In the Claims
In column 6, line 30, delete "claim 1" and insert --claim 7--, therefor.
In column 6, line 34, delete "claim 1" and insert --claim 7--, therefor.

Signed and Sealed this
Fifth Day of July, 2016

Michelle K. Lee
*Director of the United States Patent and Trademark Office*